United States Patent
Jardine et al.

(10) Patent No.: US 6,533,012 B1
(45) Date of Patent: Mar. 18, 2003

(54) TIRE WITH CIRCUMFERENTIALLY ORIENTED REINFORCEMENTS

(75) Inventors: David Jardine, Clermont-Ferrand (FR); Pedro Costa Pereira, Clermont-Ferrand (FR); Philippe Esnault, Clermont-Ferrand (FR); Jean-Claude Goutte, Clermont-Ferrand (FR); Francois Vizet, Pont-du-Chateau (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 161 days.

(21) Appl. No.: 09/610,395

(22) Filed: Jul. 5, 2000

(30) Foreign Application Priority Data

Jul. 7, 1999 (FR) .............................. 99 08901

(51) Int. Cl.[7] .............................. B60C 9/18; B60C 9/20; B60C 9/22
(52) U.S. Cl. .................. 152/527; 152/526; 152/531; 152/533; 152/534; 152/DIG. 19
(58) Field of Search .................. 152/531, 533, 152/527, 526, 534, DIG. 19; 156/117

(56) References Cited

U.S. PATENT DOCUMENTS

| 3,023,798 A | 3/1962 | Moore et al. |
| 4,140,168 A | 2/1979 | Caretta |
| 4,333,507 A | 6/1982 | Schmit et al. |
| 4,804,436 A | 2/1989 | Debroche et al. |
| 4,895,692 A | 1/1990 | Laurent et al. |
| 5,373,885 A | 12/1994 | Yamashita |
| 5,395,476 A | 3/1995 | Debroche et al. |
| 5,558,144 A | 9/1996 | Nakayasu et al. |
| 6,000,454 A | 12/1999 | Barody et al. |
| 6,224,808 B1 | 5/2001 | Essinger et al. |
| 6,234,227 B1 | 5/2001 | Bosseaux |
| 6,425,426 B1 * | 7/2002 | Osborne et al. ........ 152/531 X |

FOREIGN PATENT DOCUMENTS

| DE | 4135599 | 5/1993 |
| EP | 0248301 B1 | 6/1989 |
| EP | 0335588 | 10/1989 |
| EP | 0242840 B1 | 3/1991 |
| EP | 0467585 | 1/1992 |
| EP | 0582215 B1 | 1/1997 |
| EP | 0822047 A1 | 2/1998 |
| EP | 0718090 B1 | 11/1999 |
| FR | 2630374 | 10/1989 |
| GB | 2219557 | 12/1989 |
| WO | 9747463 | 12/1997 |

OTHER PUBLICATIONS

Patent Abstracts of Japan, JP 06055907 (Bridgestone Corp.), Pneumatic Radial Tire, Mar. 1, 1994, Abstract.
Patent Abstracts of Japan, JP 61249804 (Bridgestone Corp.), Pneumatic Radial Tire, Nov. 7, 1986, Abstract.

* cited by examiner

Primary Examiner—Adrienne C. Johnstone
(74) Attorney, Agent, or Firm—Baker Botts LLP (57) ABSTRACT

A tire whose crown has a ply of bimodulus reinforcements circumferentially oriented and spiral-wound, the ply being so arranged that, in the new tire, its reinforcements have a high-temperature contraction potential identical to that of the adhesive yarn before it is introduction in the tire. The tire has an appreciably diminished running noise.

22 Claims, 3 Drawing Sheets

TIRE WITH CIRCUMFERENTIALLY ORIENTED REINFORCEMENTS

BACKGROUND OF THE INVENTION

The invention concerns a vehicle tire and, more particularly, a tire whose architecture is optimized in order to reduce the running noises, while maintaining a high level of performance at the speed limit.

On rolling over roads, vehicle tires produce running noises due, notably, to the contacts of the edges formed by the tread pattern on the road and to the vibrations of compressed air in the grooves of the tire treads, as well as to vibrations of the carcass.

Automobile manufacturers as well as legislators seek to reduce the emission of noise of running vehicles permanently.

What is of interest here is low-speed noise, that is, for example, at a speed less than or equal to 90 km/h.

The contribution of the tire is actually really appreciable only at low speeds. In fact, beyond a certain threshold, noises of the engine, transmission or aerodynamic effects become preponderant.

Numerous efforts have been made to reduce the running noise of tires. For example, one can mention patent U.S. Pat. No. 3,023,798, which proposes modifying the pitch of tread profiles, or patent FR 2,630,374, which proposes imparting to the outer surface of the tire a roughness ranging between 100 and 2000 micrometers.

Furthermore, automobile manufacturers are developing vehicles with ever improved performances, particularly at maximum speed. Thus, customers are demanding silent tires with increased speed resistance at ever lower cost.

SUMMARY OF THE INVENTION

The invention concerns a tire whose running noise performances and high running speed resistance are improved.

In the following text, titer means the weight in grams per thousand meters of a reinforcement. The titer is expressed in tex. The stress undergone by a reinforcement or the modulus of that reinforcement is expressed in "cN/tex", cN meaning centinewton.

In the following text, "reinforcement" ("reinforcing thread") means any reinforcing element in the form of a thread, capable of reinforcing a given matrix, for example, a tire matrix. One can mention as reinforcements, for example, "multifilament yarns", those yarns being twistable or not twistable together, unitary threads such as monofilaments of high elementary diameter, with or without twisting together, wires or "cords" obtained by wiring operations or twisting of those unitary threads or yarns, such reinforcements being possibly hybrid, that is, composite, containing elements of different natures.

"Plied yarn" or "folded yarn" means a reinforcement consisting of two fibers ("single yarns") or more assembled together by twisting operations; those fibers, generally formed by multifilament yarns, are first individually twisted in one direction (twist direction S or Z) in the course of a first twisting stage, and then twisted together in the opposite direction (twist direction Z or S respectively) in the course of a second twisting stage.

"Adhesive reinforcement" means a reinforcement having undergone an appropriate coating treatment, called sizing or adhesion, capable of making that reinforcement adhere, after suitable heat treatment, to the matrix for which it is intended.

The invention concerns a tire containing a crown extended by two sidewalls and two beads, a carcass anchored in both beads, in which the crown contains a reinforcing ply consisting of parallel reinforcements oriented at an angle α relative to the circumferential direction ranging between 10 and 45 degrees and at least one ply of textile reinforcements circumferentially oriented and spiral-wound. That tire is characterized in that the circumferentially oriented reinforcements possess an initial modulus less than 900 cN/tex and develop a stress under 3% deformation above 12 cN/tex and in that in the tire, when new, the circumferentially oriented reinforcements have, whatever their axial position, a high-temperature contraction potential (CS) less than or equal to the high-temperature contraction potential of the reinforcements before their incorporation in the tire.

It has been found that the use of such a roughly circumferentially oriented reinforcing ply makes it possible to obtain a marked reduction of the running noise of the tire associated with a high level of speed resistance. That reduction can reach 1 dB(A).

The invention also concerns a tire containing a ply of similar spiral-wound circumferentially oriented reinforcements with laying diameters roughly corresponding, over the whole width of the crown, to the final diameters of the reinforcements in the tire after vulcanization.

The circumferentially laid reinforcements, with laying diameters departing, over the whole width of the crown, by at most 0.5% from the final diameters of those reinforcements in the tire after vulcanization, do not undergo any notable shaping operation in the building of the tire or its vulcanization. Such notable shaping would entail, for example, on building or vulcanization, a local extension of those reinforcements exceeding 2 or 3%. That extension generally affects the properties of the reinforcements so deformed, namely, their modulus, their contraction potential and their state of tension. As a result, the reinforcements used in the invention are in a state in the vulcanized tire, over the whole ply, very close to that of the adhesive reinforcement before being placed on the tire. On low-speed rolling, the circumferentially laid reinforcement can support extension in the order of 1 to 2% on passage into the area of contact; thus, the reinforcements used in the invention undergo that type of extension, while behaving like low-modulus reinforcements.

On the other hand, those reinforcements, on high-speed rolling, are stressed to higher deformation and then react as high-modulus reinforcements. They can then ensure effective hooping of the crown, which makes it possible to withstand forces due to centrifugation, even at very high speeds.

The reinforcements of the invention preferably have an initial modulus less than 800 cN/tex and/or develop a stress under 3% deformation above 20 cN/tex.

The mechanical properties of the reinforcements are measured on the reinforcements, which have been subjected to a preconditioning. "Preconditioning" is understood to mean the storage of the reinforcements for at least 24 hours, before measurements, in a standard atmosphere according to European Standard DIN EN 20139 (temperature of 20°±2° C.; hydrometry of 65±2%).

Initial modulus means, after having subjected the reinforcements to an initial tension equal to the half-sum of the titers of each of the elementary fibers (i.e., an initial tension of 0.5 cN/tex), the secant modulus measured on the reinforcements, at the same conditions as the preconditioning, under a 0.7% deformation; the samples have an initial length of 400 mm and the rate is 200 mm/min (or 50 mm/minute when their elongation at break does not exceed 5%); the measurements of moduli and stresses are understood to cover the average of ten samples.

Such reinforcements consist of at least one fiber of a material having a high modulus (preferably aramide, but, without departing from the spirit of the invention, it is possible to use other high-modulus textiles originating from liquid crystal polymers like, for example, paraphenylene benzobisoxazole (PBO)) and at least one fiber of a material having a low modulus (preferably nylon, but also polyethylene terephthalate).

The titer of these adhesive reinforcements can range between 250 and 800 tex. The titer is preferably above 400 tex.

The spiral-wound circumferentially oriented reinforcements are preferably arranged in a single layer and the laying pitch of these reinforcements exceeds 1.5 times the diameter of the reinforcements.

According to one advantageous embodiment, the reinforcements of the crown reinforcement ply present an orientation relative to the circumferential direction varying from $\alpha_1$ in the midplane of the crown to $\alpha_2$ at the lateral ends of said ply with $\alpha_1-\alpha_2$ exceeding 3 degrees. Preferably, $\alpha_1-\alpha_2$ exceeds 8 degrees. The variation of the angle at the edge is made roughly over one-third, if not two-thirds, of the half-width.

The act of increasing the angle of orientation of the reinforcements of the crown reinforcement ply in the center part of the tire increases the running noise gain.

In order to preserve that running noise gain, it has been found that it is desirable to keep $\alpha_1$ above 26 degrees and below 38 degrees. Preferably, $\alpha_1$ is between 27 and 38 degrees.

The laying pitch of the spiral-wound reinforcement ply can then be less in the lateral zones of the crown that in the center of the tire crown. Lateral zone means from 10 to 35% of the half-width of the crown. Consequently, the hooping density of the circumferentially oriented reinforcements is greater in the lateral zones or shoulders of the tire than in the center. That configuration has the advantage of further improving the running noise gain and of offering an excellent resistance of the shoulder to the centrifugation forces even at the highest speeds. The variation of laying pitch can be greater than or equal to a factor 1.2.

The reinforcing ply roughly spiral-wound circumferentially can be arranged above the reinforcing ply oriented at an angle $\alpha$. It can also be placed between the carcass ply and the reinforcing ply or even under the carcass ply. Finally, when the crown comprises two reinforcing plies oriented at angles $\alpha$, $\beta$ relative to the circumferential direction, that ply of circumferential reinforcements can be arranged between those two reinforcing plies.

Positioning the reinforcements oriented at 0° between or under the angled plies has the effect of increasing, by flattening deflection, the level of deformation imposed on the reinforcements oriented at 0°. It is then particularly advantageous to use the reinforcements according to the invention in those configurations.

Several embodiments of the invention are now described by reference to the accompanying drawing.

DESCRIPTION OF PREFERRED EMBODIMENTS

Figure 1:
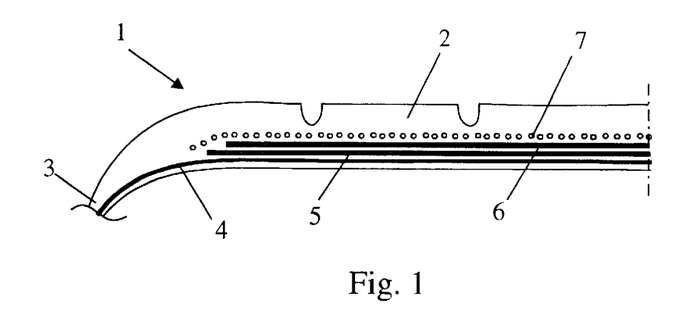
FIG. 1 shows an axial half-section of a tire.

FIG. 1 shows an axial half-section of a tire 1 according to the invention. That tire embodies a crown 2 extended by two sidewalls 3 and two beads not represented. The crown contains a carcass ply 4 anchored in known manner in the two beads, two reinforcing plies 5 and 6 formed by parallel reinforcements in each ply and crossed from one ply to the next by forming angles ($\alpha$, $\beta$) with the circumferential direction in the order of 30 degrees and a ply 7 of reinforcements circumferentially oriented. The carcass ply 4 is oriented roughly at 90 degrees relative to the circumferential direction; it is a radial carcass ply.

The circumferentially oriented reinforcing ply 7 consists of textile reinforcements according to the invention, spiral-wound to secure good hooping of the crown 2.

Specific examples of fabrication and properties of these reinforcements are supplied below.

As described in the invention, those reinforcements have a mechanical behavior very different from the slight deformations in which they have a low modulus and from the higher deformations in which they develop extension stresses comparable to those of reinforcements of high modulus of elasticity, such as aramide or wire reinforcements. They can be called "bimodulus" reinforcements. The use of such reinforcements in tires is known to secure a hooping function of the crown by spiral circumferential winding, because their low initial modulus enables them to support the shaping deformations of tires on their fabrication or vulcanization.

However, the use and application made of them here are quite different. In order to retain the benefit of the low initial modulus in the vulcanized tire, it is advisable to master raw tire building so as to contain within low limits any elongation produced by a configuration due to the manufacturing process.

The reinforcements of the invention are made from the combination of at least one yarn of a material having a high modulus (preferably aramide, but, without departing from the spirit of the invention, it is possible to use other high-modulus textiles originating from liquid crystal polymers like, for example, paraphenylene benzobisoxazole (PBO)) and at least one fiber of a material having a low modulus (preferably nylon, but also polyethylene terephthalate). In order to make the reinforcements of the invention, an overtwisting of a number of turns per meter noted Z is applied in a first stage to each of the elementary fibers constituting the final reinforcement. A twist is then simultaneously applied to all of the fibers thus overtwisted in the direction opposite the direction of overtwisting of a number of turns per meter noted S. The value of twist S (in number of turns per meter) of the yarns of the invention is such that torsion coefficient $$K = S \times \frac{\sqrt{T_i}}{\cos\left[(n-2)\frac{\pi}{6}\right]}$$

is greater than 2500 and less than 7000. $T_i$ is the titer of the fiber of high modulus (expressed in tex) introduced in the yarn, and n is the total number of fibers in the yarn. Preferably, overtwisting of the elementary fibers Z (in number of turns per minute) is such that Z/S≈1. The reinforcements are sized in a series of stages by passage into glue baths typical of the state of the art and heat-treated under a tension making it possible to give the reinforcement the contraction potential level (CS) required.

The "high-temperature contraction potential" called "CS" means the relative variation of length of a textile reinforcement positioned, under a prestress equal to the half-sum of the titers of each of the elementary fibers, between the shelves of an oven (TESTRITE type) regulated at a constant temperature of 185±0.5° C. The CS is expressed in % by the following formula: CS (%)=100×|$L_1$−$L_0$|/$L_0$ where $L_0$ is the initial length of the adhesive reinforcement at room temperature under a prestress equal to the half-sum of the titers of each of the elementary fibers and $L_1$ the length of that same reinforcement at 185° C. The length $L_1$ is measured at the end of a reinforcement stabilization time at temperature of 185° C. equal to 120 s±2%. The standard deviation on the CS measurement is ±0.15%.

That potential is the direct consequence of the series of operations that the reinforcements underwent on its manufacture or on its use.

The high-temperature contraction potential of the reinforcements according to the invention before their incorporation in the tire is preferably higher than 0.5% and, even better, higher than 1%.

The reinforcements of the ply 7 in the tire, when new, whatever their position in the width of the crown, have a high-temperature contraction potential (CS) equal to or less than their CS before their incorporation in the tire 1.

That means that, during all of the tire building operations, after having arranged the reinforcements of the ply 7, those reinforcements do not undergo any significant extension linked to a shaping of the tire on its building or on its vulcanization.

After vulcanization of a tire 1 according to the invention, several sections of reinforcements of the ply 7 were extracted and their high-temperature contraction potential was measured immediately (that is, the time interval separating extraction of the reinforcement from introduction of that same reinforcement in the TESTRITE oven is less than 60 seconds). Those measurements confirmed that the value of their CS is well less than or equal to what they had before introduction in the tire, whatever their axial position in the tire. Force-displacement curves were also plotted on those sections extracted from a tire. The results obtained are similar to curve c of FIG. 2.

In a first embodiment, the tire according to the invention can advantageously be built on a rigid core setting the shape of its inner cavity, as described by EP 242,840 or EP 822,047, which are incorporated herein by reference. All of the tire components are applied on that core, in the order required by the final architecture, being directly arranged in their final place, without undergoing shaping at any time of manufacture. Curing takes place on the core, the latter being removed only after the vulcanization phase.

That method of manufacture has the advantage of markedly reducing if not eliminating the prestresses imposed on the reinforcements, particular those oriented at 0° on traditional shaping phases.

The casing on the core can also be partially cooled in order to maintain the reinforcements in the state of deformation required on laying.

The tire can also be equivalently manufactured on a drum, such as described in WO 97/47463 or EP 718,090, on condition of shaping of the tire blank before laying the circumferentially oriented reinforcements.

The circumferentially oriented reinforcements can also be laid on a form with geometry identical to the form aimed at in the curing mold. The crown block is then assembled with the complementary blank of the tire according to the transfer techniques known to the expert and then, also according to known principles, the tire is fitted and pressurized by spread of a membrane inside the tire.

That embodiment also guarantees the absence of prestresses due to shaping in a vulcanization press.

All those embodiments make it possible to obtain circumferentially oriented reinforcements that are spiral-wound with laying diameters departing, over the whole width of the crown 2, by less than 0.5% from the final diameters of those reinforcements in the tire after vulcanization.

The following test makes it possible to illustrate well the interest of the tires according to the invention.

That test concerns tires of dimension 185/75-14. The crown block comprises two crossed reinforcing plies consisting of nonhooped wire reinforcements 9.28 with pitch of 2.5 mm as well as a ply of circumferentially oriented reinforcements 7 consisting of reinforcements conforming or not to the invention, as defined below. The results relating to that test are grouped in Table 1.

The three tires of that test contain a circumferentially oriented reinforcing ply, the density of which is 80 reinforcements/dm.

Tire A contains a ply with a nylon reinforcement not conforming to the invention. The nylon reinforcement is an adhesive yarn of titer 441 tex made from two identical nylon fibers of 210 tex individually overtwisted at 200 t/m (turns/meter) and then simultaneously retwisted at 200 t/m in the opposite direction. The CS of the nylon reinforcement is 7%. The initial modulus of that reinforcement is equal to 530 cN/tex, and the stress developed under 3% is 9 cN/tex.

Tire B contains a ply with an aramide reinforcement not conforming to the invention. That reinforcement is an adhesive yarn of titer equal to 376 tex made from two identical aramide fibers of 167 tex individually overtwisted at 440 t/m and then simultaneously retwisted at 440 t/m in the opposite direction. The initial modulus of that reinforcement is equal to 2030 cN/tex, and the stress developed under 3% is 68 cN/tex.

Tire C contains a ply with a bimodulus reinforcement conforming to the invention. That reinforcement is an adhesive yarn of titer equal to 521 tex made from two identical aramide fibers of 167 tex individually overtwisted at 280 t/m and from a nylon fiber of 140 tex overtwisted at 280 t/m, those three fibers then being simultaneously retwisted at 280 t/m in the opposite direction. The CS of the adhesive reinforcement is equal to 1.5%. The initial modulus of that reinforcement is equal to 740 cN/tex, and the stress developed under 3% is equal to 30 cN/tex. The torsion coefficient is 4180.

Figure 2:
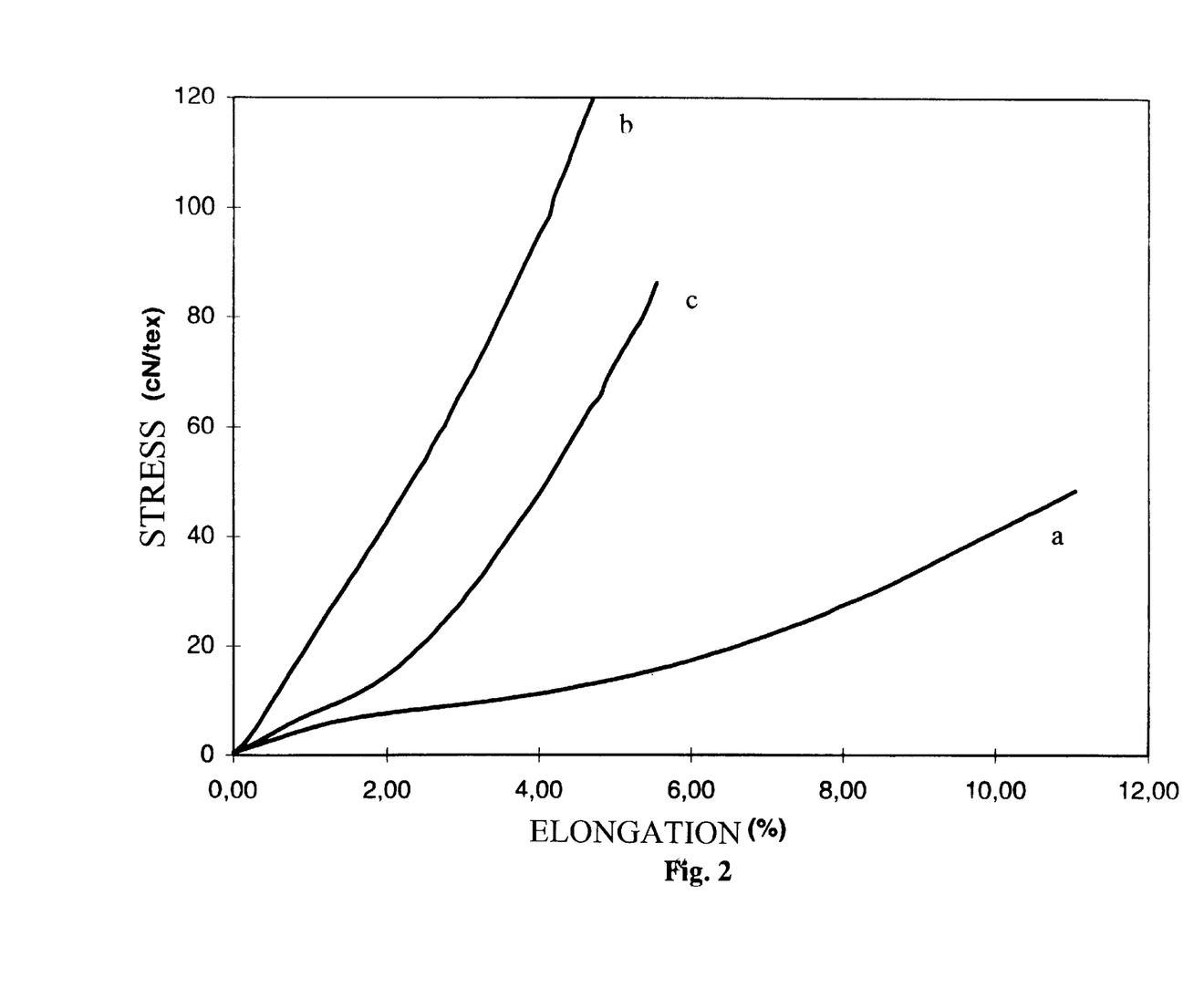
FIG. 2 shows the force-elongation curves of the three textile reinforcements described in the following examples: curves a and b characterize reinforcements not conforming to the invention; curve c is that of a reinforcement conforming to the invention.

The force-elongation curves of the three reinforcements used in this test are represented on FIG. 2:
- curve a: nylon reinforcement;
- curve b: aramide reinforcement; and
- curve c: aramide-nylon bimodulus reinforcement.

Three tests were conducted for these tires:
- determination of drift rigidity: at given speed, inflation pressure and load, an angle of drift is set and the resultant drift thrust is measured, the result being expressed by taking the drift thrust/drift angle ratio; the measurement is ordinarily made between ±1 degree angle of drift;
- speed resistance: at given load and inflation pressure, the speed of the tire is progressively increased until it is destroyed; the result of the test is given by the maximum speed attained and by observation of the cause of destruction of the tire; and
- "coast by" noise: that test is representative for a nearby resident of the acoustic discomfort produced on passage of a vehicle at constant speed over a highway-type road of intermediate grading; a vehicle is made to pass at a given speed, transmission in neutral and engine cut off, over a standardized measurement area (standard ISO DIS 10 844); microphones register the noise levels in dB(A).

Table 1 presents the type of circumferential reinforcement used as well as the results of the three foregoing tests.

TABLE 1

| No. | Ply at 0° | Coast by Noise (60 km/h) | Speed | Resistance/ Appearance of Skin | Rigidity of drift |
|---|---|---|---|---|---|
| A | Nylon | 100 | 100 | Crown dislocation/ Nylon melting | 100 |
| B | aramide | +0.9 dB(A) | 102 | Crown dislocation | 115 |
| C | bimodulus | 100 | 101 | Tread loss | 105 |

The three tires of the test present slightly different high-speed resistances as far as maximum speed attained is concerned, in the order of 200 km/h. Tire B with a 0° oriented aramide reinforcement reaches the highest level, followed by tire C with a bimodulus reinforcement. It is to be noted, on the other hand, that tires A and B both present a dislocation of the crown, while tire C has only a loss of tread. That represents a performance advantage of tire C for safety of use according to the invention.

The rigidities of drift of the three tires are notably different, in the order of the moduli of the reinforcements used, as presented in FIG. 2.

Finally, the running noise test reveals a notable deterioration of the tire 2 whose reinforcing ply oriented at 0° consists of aramide. An increase of 0.9 dB(A) noise in that tire is observed at 60 km/h.

The test thus shows that tire C, whose bimodulus 0° reinforcing ply consists of the reinforcement according to the invention offers an excellent compromise among the three properties tested with improved rigidity of drift and speed resistance for the same noise level.

Figure 3:
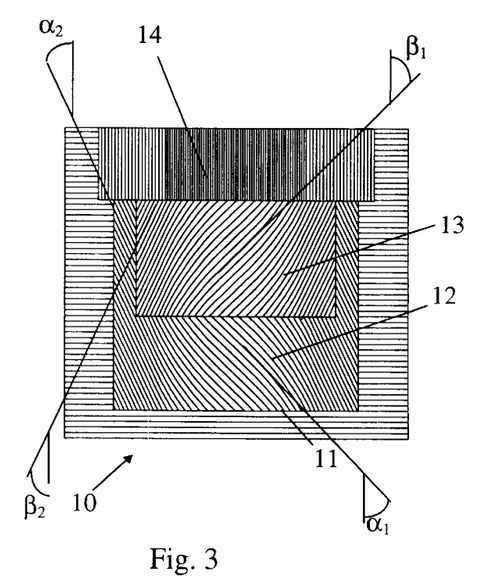
FIG. 3 presents an exploded view of the crown of a tire.

FIG. 3 presents an exploded view of a tire according to a variant of the invention. That tire 10 contains an appreciably radial carcass ply 11 and two crossed reinforcing plies 12 and 13 as well as a 0° reinforcing ply 14. The two crossed reinforcing plies 12 and 13 have their center part oriented at an angle $\alpha_1$ and $\beta_1$ respectively equal to 35 degrees and their two lateral parts oriented at angles $\alpha_2$ and $\beta_2$ respectively equal to 25 degrees. The increase in angle of orientation of the reinforcements in the center part of the plies has a positive complementary effect on coast by running noise. The tire 10 of FIG. 3 presents, finally, a 0° reinforcing ply 14 whose reinforcement laying pitch is less in the center part. The greater density of the reinforcement in the center zone of the tire crown ensures good hooping in the zones where the angle of orientation of the crossed reinforcing plies is greater. That embodiment offers very good maintenance of the tire profile with speed.

Figure 4:
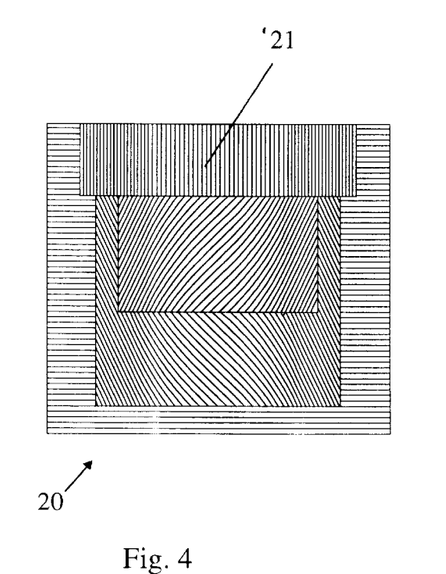
FIG. 4 presents an exploded view of the crown of another tire embodiment.

FIG. 4 presents an exploded view of the crown of a tire 20 similar to that of FIG. 3. The only difference lies in the reinforcing ply 21 at 0° whose variation of the laying pitch in the width of the crown is opposite. The reinforcement laying pitch in the lateral zones is less than in the center zone of the crown. That configuration further improves the close by running noise and offers excellent resistance of the lateral zones of the crown or shoulders to centrifugation forces, even at very high speed.

The crossed reinforcing plies, as described in FIGS. 3 and 4, can be made, notably, by using the device described in patent EP 248,301, adjusting the curvature of the wire guides corresponding to reference 280, or the device of patent EP 582,215 presented in FIG. 6, varying the rate of application of the reinforcing section with its application site. It is advisable here to increase the rate of application of the reinforcing section in the center part of the crown slightly over the rate of application in the two lateral parts of the crown.

A second test involves tires of dimension 225/55-16 intended for high-speed vehicles. The crown block contains two crossed reinforcing plies consisting of nonhooped wire reinforcements 6.23 at pitch of 1.5 mm, as well as a ply of circumferentially oriented reinforcements 7 consisting of nylon, aramide or "bimodulus" reinforcements.

Tire D has its two crossed plies oriented at angles $\alpha$, $\beta$ equal to 27°. The 0° reinforcing ply is obtained by spiral winding of an adhesive reinforcement. That reinforcement is an adhesive yarn of titer 310 tex made from two identical nylon fibers of 140 tex individually overtwisted at 250 t/m and then simultaneously retwisted at 250 t/m in the opposite direction. The CS of the nylon reinforcement is 7%. The initial modulus of that reinforcement is equal to 480 cN/tex, and the stress developed under 3% is 9 cN/tex. To obtain an acceptable speed resistance, that ply is arranged in two superposed layers by a method of spiral winding of a belt of rubber-coated reinforcements. The reinforcing density is 150 reinforcements per dm in the center and 200 reinforcements per dm in the lateral zones of the crown.

Tire E has its two crossed plies oriented at angles $\alpha_1$, $\beta_1$ equal to 30° in the center zone of the crown and $\alpha_2$, $\beta_2$ equal to 26° at the edges of the plies. The 0° reinforcing ply is obtained by spiral winding of an adhesive reinforcement not conforming to the invention. That reinforcement is an adhesive yarn of titer 441 tex made from two identical nylon fibers of 210 tex individually overtwisted at 200 t/m and then simultaneously retwisted at 200 t/m in the opposite direction. The CS of the nylon reinforcement is 7%. The initial modulus of that reinforcement is equal to 530 cN/tex, and the stress developed under 3% is 9 cN/tex. That ply is arranged with a density of 100 reinforcements per dm in a single layer.

Tire F has its two crossed plies oriented at angles $\alpha$, $\beta$ similar to those of tire 2, with greater angling at the center of the plies than at the edges. The 0° reinforcing ply is obtained by spiral winding of an adhesive reinforcement not conforming to the invention. That reinforcement is an adhesive yarn of titer equal to 376 tex made from two identical aramide fibers of 167 tex individually overtwisted at 440 t/m and then simultaneously retwisted at 440 t/m in the opposite direction. The initial modulus of that reinforcement is equal to 2030 cN/tex, and the stress developed under 3% is 68 cN/tex. That ply is arranged with a density of 90 reinforcements per dm in a single layer. The laying pitch is greater than 1.5 times the diameter of the reinforcement.

Tire G has its two crossed plies oriented at angles α, β similar to those of tires E and F. The 0° reinforcing ply is obtained by spiral winding of a bimodulus adhesive reinforcement conforming to the invention. That reinforcement is an adhesive yarn of titer equal to 521 tex made from two identical aramide fibers of 167 tex individually overtwisted at 280 t/m and from a nylon fiber of 140 tex overtwisted at 280 t/m, those three fibers then being simultaneously retwisted at 280 t/m in the opposite direction. The CS of the adhesive reinforcement is equal to 1.5%. The initial modulus of that reinforcement is equal to 740 cN/tex, and the stress developed under 3% is equal to 30 cN/tex. That ply is arranged with a density of 90 reinforcements per dm and has a pitch greater than 1.5 times the diameter of the reinforcement.

Table 2 presents the results obtained in the speed resistance and running noise tests.

TABLE 2

| No. | Crossed Plies $\alpha_1$-$\alpha_2$ | Ply at 0° (tex) | Ply density at 0° (reinforcements/dm) | Speed resistance | Coast by noise |
|---|---|---|---|---|---|
| D | 27°–27° | Nylon 140 × 2 | Double layer 150–200 | 100 | Ref. |
| E | 30°–26° | Nylon 210 × 2 | Single layer - 100 | 80 | –0.9 dB(A) |
| F | 30°–26° | aramide 167 × 2 | Single layer - 90 | 110 | id. Ref. |
| G | 30°–26° | bimodulus: aramide 167 × 2 Nylon 140 | Single layer - 90 | 115 | –0.9 dB(A) |

Tire D presents a classic solution to hooping of the crown block of a high-performance tire by means of several layers of nylon reinforcement.

For tire E, the increase of angles $\alpha_1$, $\beta_1$ of the crossed reinforcing plies at the center of the crown, even with a reduction of $\alpha_2$ and $\beta_2$ at the edges, associated with the reduction of density of the reinforcements oriented at 0°, very markedly impairs speed resistance. An improvement of coast by running noise is also observed (tire E).

Tire F has an improved speed resistance, but a running noise performance remaining identical to that of the control, tire D.

Finally, tire G, according to the invention, whose 0° reinforcing ply is made with a bimodulus reinforcement, presents a very marked speed resistance improvement coupled with a pronounced improvement in coast by running noise.

The invention proposed thus makes it possible to design a tire having very wide crossed reinforcing ply angles with improvement in speed resistance with a single hooping ply, as well as in coast by noise performance.

Figure 5:
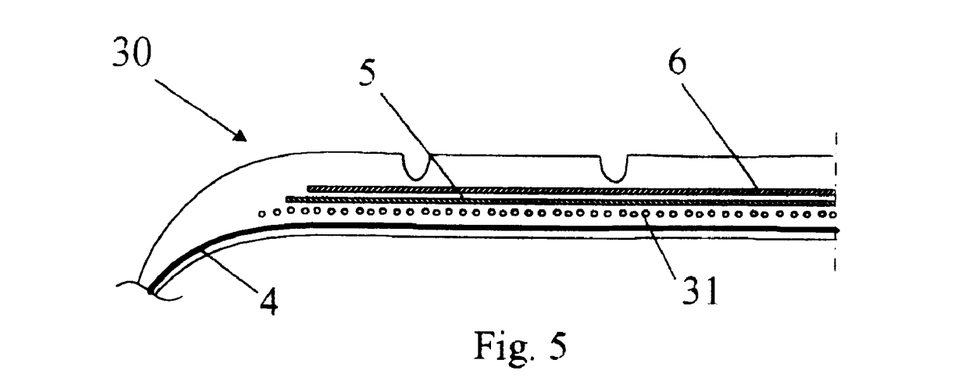
FIG. 5 shows an axial half-section of a tire with a hooping ply at 0 degree placed between the carcass ply and two crossed reinforcing plies.

FIG. 5 presents a partial axial half-section of a tire 30 containing, as previously, a carcass ply 4, two crossed reinforcing plies 5, 6 and a 0° reinforcing ply 31. In that tire 30 the ply 31 is placed radially between the two crossed reinforcing plies and the carcass ply 4. That arrangement has the advantage in protecting the 0° reinforcing ply 31 from possible damage due to punctures of the tread.

Figure 6:
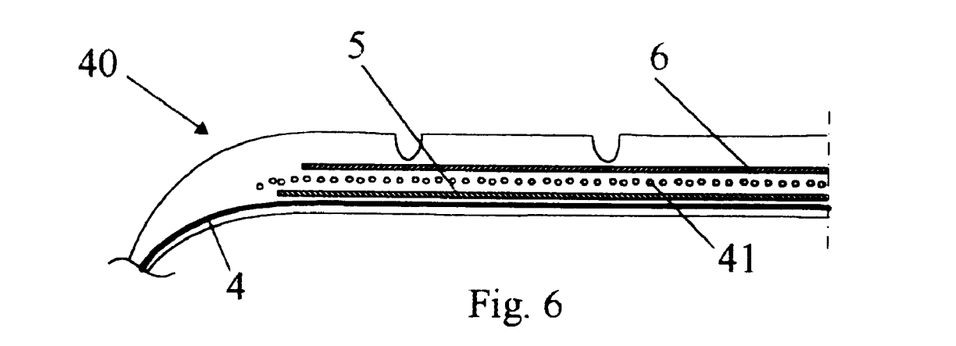
FIG. 6 shows an axial half-section of a tire with a hooping ply at 0 degree placed between two crossed reinforcing plies.

Another arrangement is presented in FIG. 6. In that figure the tire 40 shows a 0° reinforcing ply 41 placed between the two crossed reinforcing plies 5 and 6.

Figure 7:
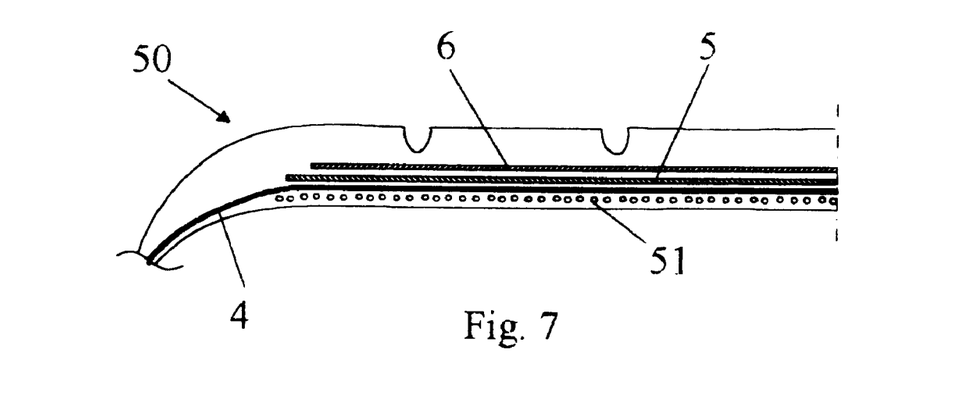
FIG. 7 shows an axial half-section of a tire with a hooping ply at 0 degree placed radially under the carcass ply.

A final possibility is presented in FIG. 7. That tire 50 shows a 0° reinforcing ply 51 placed radially under the carcass ply 4.

For those three configurations, although on rolling in the area of contact the bending stresses will result in greater tension on the reinforcements of those plies 31, 41 and 51, it is very advantageous to use the reinforcements of the invention to improve the speed resistance and close by noise performances.

It is to be noted that all of the embodiments of the invention have been described considering crown architectures containing two reinforcing plies consisting of reinforcements oriented at angles α, β in relation to the circumferential direction. The invention also applies to crown architectures containing only one angled reinforcing ply as well as any architecture containing more than two crossed reinforcing plies.

We claim:

1. A tire having a crown extended by two sidewalls and two beads, with a carcass anchored in both beads, said crown comprising:
   at least one reinforcing ply having of parallel reinforcements and oriented at an angle α relative to the circumferential direction ranging between 10 and 45 degrees, and
   at least one ply of textile reinforcements circumferentially oriented and spiral-wound, characterized in that in said tire, when new, said circumferentially oriented reinforcements possess an initial modulus less than 900 cN/tex and develop a stress under 3% deformation exceeding 12 cN/tex.

2. A tire according to claim 1, in which said circumferentially oriented reinforcements have an initial modulus less than 800 cN/tex.

3. A tire according to claim 1, in which said circumferentially oriented reinforcements develop a stress under 3% deformation exceeding 20 cN/tex.

4. A tire according to claim 1, in which said circumferentially oriented reinforcements consist of an assembly of at least one nylon fiber combined with at least one aramide fiber.

5. A tire according to claimed in which said circumferentially oriented reinforcements have an adhesive titer greater than 250 tex and less than 800 tex.

6. A tire, according to claim 5, in which said circumferentially oriented reinforcements have an adhesive titer greater than 400 tex and less than 800 tex.

7. A tire according to claim 1, in which the spiral-wound circumferentially oriented reinforcements are arranged in a single layer.

8. A tire according to claim 7, in which the laying pitch of said spiral-wound circumferentially oriented reinforcements is greater than 1.5 times the diameter of said reinforcements.

9. A tire according to claim 1, in which the reinforcements of the crown reinforcing ply present an orientation relative to the circumferential direction varying from $\alpha_1$ in the midplane of the crown to $\alpha_2$ at the side ends of said ply with $\alpha_1$-$\alpha_2$ exceeding 3 degrees.

10. A tire according to claim 9, in which $\alpha_1$-$\alpha_2$ exceeds 8 degrees.

11. A tire according to claim 12, in which $\alpha_1$ is greater than 26 degrees and less than 38 degrees.

12. A tire, according to claims 9, in which the laying pitch of the spiral-wound reinforcements is less in the lateral zones of the crown than in the center of said crown.

13. A tire according to claim 12, in which the laying pitch of the spiral-wound reinforcements is at least 1.2 times less in the lateral zones of the crown than in the center of the tire crown.

14. A tire according to claim 9, in which the laying pitch of the spiral-wound reinforcements is greater in the lateral zones of the crown than in the center of the crown of said tire.

15. A tire according to claim 14, in which the laying pitch of the spiral-wound reinforcements is at least 1.2 times greater in the lateral zones of the crown than in the center of the tire crown.

16. A tire according to claim 1, in which said spiral-wound reinforcements are arranged radially above said crown reinforcing ply.

17. A tire according to claim 1, in which said spiral-wound reinforcements are directly placed radially outside the said carcass.

18. A tire according to claim 1, in which said crown comprises at least two superposed reinforcing plies formed by parallel reinforcements in each ply and crossed from one ply to the next by forming angles ($\alpha$, $\beta$) with the circumferential direction ranging between 10 and 45 degree, and in which said spiral-wound reinforcements are arranged radially between said two crown reinforcing plies.

19. A tire according to claim 1, in which said spiral-wound reinforcements are arranged radially inside said carcass.

20. A tire having a crown extended by two sidewalls and two beads, with a carcass anchored in both beads, said crown comprising:

at least one reinforcing ply having parallel reinforcements and oriented at an angle $\alpha$ relative to the circumferential direction ranging between 10 and 45 degrees, and     at least one ply of textile reinforcements circumferentially oriented and spiral-wound, characterized in that said circumferentially oriented reinforcements possess an initial modulus less than 900 cN/tex and develop a stress under 3% deformation above 12 cN/tex and in that in the tire, when new, said circumferentially oriented reinforcements have, whatever their axial position, a high-temperature contraction potential (CS) less than or equal to the high-temperature contraction potential of said reinforcements before their incorporation in the tire.

21. A tire having a crown extended by two sidewalls and two beads, with a carcass anchored in both beads, said crown comprising:

at least one reinforcing ply having parallel reinforcements and oriented at an angle $\alpha$ relative to the circumferential direction ranging between 10 and 45 degrees, and     at least one ply of textile reinforcements circumferentially oriented and spiral-wound, characterized in that said circumferentially oriented reinforcements possess an initial modulus less than 900 cN/tex and develop a stress under 3% deformation above 12 cN/tex and in that said circumferentially oriented reinforcements are spiral-wound with laying diameters substantially corresponding, over the whole width of the crown, to the final diameters of said reinforcements in the tire after vulcanization.

22. A tire according to claim 21, in which said circumferentially oriented reinforcements are spiral-wound with laying diameters departing, over the whole width of the crown, by less than 0.5% from the final diameters of said reinforcements in the tire after vulcanization.

* * * * *

UNITED STATES PATENT AND TRADEMARK OFFICE
CERTIFICATE OF CORRECTION

| | | |
|---|---|---|
| PATENT NO. | : 6,533,012 B1 | |
| DATED | : March 18, 2003 | |
| INVENTOR(S) | : Jardine et al. | |

It is certified that error appears in the above-identified patent and that said Letters Patent is hereby corrected as shown below:

<u>Title page,</u>
Item [57], ABSTRACT,
Line 5, "it is" should read -- its --

<u>Column 3,</u>
Line 51, insert -- According to another configuration, the laying pitch of the spiral-wound reinforcement ply can be greater in the lateral zones of the crown than in the center of the tire crown. That increases the hooping density of the reinforcements circumferentially oriented in the center of the crown, where the orientation of the reinforcements of the reinforcing ply relative to the circumferential direction $\alpha_1$ is highest. With identical running noise performance, that configuration has the advantage of offering better maintenance of the tire profile with speed. That variation of laying pitch can be greater than or equal to a factor 1.2. --
Line 67, "drawing." should read -- drawings. --

<u>Column 10,</u>
Line 26, "of" should be deleted
Line 47, "claimed" should read -- claim 1, --
Line 50, "tire," should read -- tire --
Line 66, "claim 12," should read -- claim 9, --

<u>Column 11,</u>
Line 1, "claims" should read -- claim --
Line 26, "degree," should read -- degrees, --

Signed and Sealed this

Seventh Day of October, 2003

JAMES E. ROGAN
*Director of the United States Patent and Trademark Office*